Oct. 4, 1938.	M. M. MAGUIRE ET AL	2,131,812

NUT LOCK

Filed April 17, 1936

INVENTORS.
MABLE M. MAGUIRE.
RUSSELL WRIGHT.
BY.

ATTORNEY.

Patented Oct. 4, 1938

2,131,812

UNITED STATES PATENT OFFICE 2,131,812

NUT LOCK

Mable M. Maguire, Yreka, Calif., and Russell Wright, Seattle, Wash., assignors of one-fourth to Manual S. Alves, Yreka, Calif.

Application April 17, 1936, Serial No. 74,926

1 Claim. (Cl. 151—29)

This invention relates to a nut lock whereby a nut is effectively held against retraction on a bolt.

An object of our invention is to provide a novel nut lock which is simple in construction and inexpensive to manufacture, and which can be quickly and easily placed in locking position on the nut when said nut is screwed onto the bolt.

A further object is to provide a novel nut lock which will effectively hold the nut against retraction whether the nut is loosely or tightly pressed against a plate or the like thru which the bolt extends.

Other objects, advantages and features of invention may appear from the accompanying drawing, the subjoined, detailed description and the appended claim.

Figure 1:
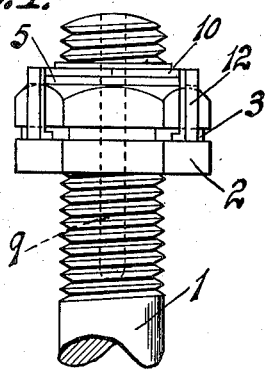
Figure 1 is a side elevation of our nut lock in operative position.
Figure 4:
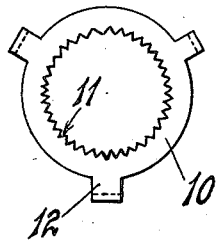
Figure 4 is a top plan view of the locking ring.

Referring more particularly to the drawing, the numeral 1 indicates a bolt upon which the nut 2 is threaded. The nut is provided with a recess 3 in each of the faces thereof. The purpose of the recesses will be further described.

Our nut lock consists of an inner washer 4 which includes a flange 5 and an upwardly extending annulus 6. The outer surface of the annulus is toothed or corrugated, as shown at 7. The washer is keyed to the bolt by means of a tongue 8 which extends into the groove 9 in the bolt.

A ring 10 is formed with teeth or corrugations 11 on the inner surface thereof. These teeth are adapted to mesh with the teeth 7 on the washer and since the teeth are substantially regular thruout the entire circumference of the washer and ring, the ring and washer can be inter-locked in any relative position.

Figure 2:
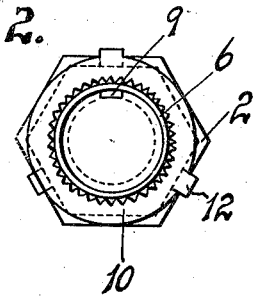
Figure 2 is a top plan view of the same.
Figure 5:
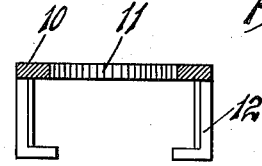
Figure 5 is a transverse sectional view of the same.
Figure 6:
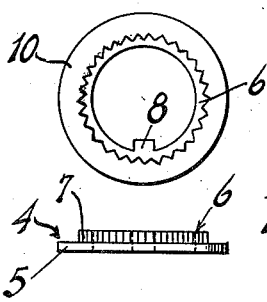
Figure 6 is a plan view of the inter-locking ring and washer.
Figure 7:
Figure 7 is a side elevation of the washer.
Figure 3:
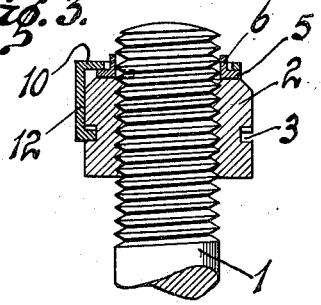
Figure 3 is a transverse sectional view of the nut lock and nut, a fragment of the bolt being shown in elevation.

A plurality of fingers 12 depend from the ring 10, and the lower ends of these fingers extend into a groove 3 in one of the flat faces of the nut 2. Also, these fingers lie against the flat faces of the nut, thereby effectively gripping the nut and holding it against rotation in the following manner:

After the nut 2 is screwed onto the bolt in the desired position, the washer 4 is dropped over the bolt and onto the top of the nut. The tongue 8 is fitted in the groove 9, and consequently, the washer cannot rotate relative to the bolt. The ring 10 is now inter-locked with the washer 5 by means of the inter-engaging teeth 7, 11. The fingers 12 are now pressed into the grooves 3 and lie flat against the faces of the nut, as shown in Figs. 1 and 2. Thus, the nut cannot rotate without moving the ring and the ring is held against rotation because of its inter-engagement with the washer. The fingers 12 also act to hold the ring against accidental displacement.

Figure 8:
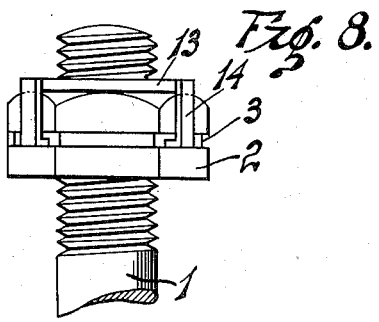
Figure 8 is a side elevation of a slightly modified form of nut lock.
Figure 9:
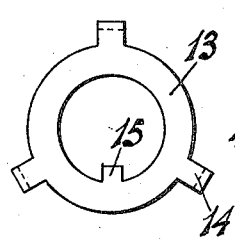
Figure 9 is a plan view of the modified form of lock.

In Figs. 8 and 9, a nut lock is shown in which the separate washer is eliminated. A ring 13 is provided with depending fingers 14 which fit into one of the grooves 3. A tongue 15 on the ring fits into the usual key slot or groove in the bolt, thus holding the ring against rotation, and the depending fingers of the ring engage the bolt and hold it against rotation.

Having described our invention, we claim:

A nut lock including a bolt, a nut threaded on the bolt, said nut having recesses in the faces thereof, a washer, a tongue on the washer, said bolt having a groove to receive the tongue, said washer having continuous external teeth thereon, a ring, continuous internal teeth on the ring engageable with the teeth on the washer, and arms depending from the ring, said arms extending into the recesses whereby the ring is held on the nut.

MABLE M. MAGUIRE.
RUSSELL WRIGHT.